(No Model.)

W. H. WILDER.
OIL STOVE.

No. 545,004. Patented Aug. 20, 1895.

Attest
James M. Spear
Wm. J. Hall

Inventor
William H. Wilder
by Wallen Donaldson & Co
Att'ys

UNITED STATES PATENT OFFICE.

WILLIAM H. WILDER, OF NORTHAMPTON, MASSACHUSETTS.

OIL-STOVE.

SPECIFICATION forming part of Letters Patent No. 545,004, dated August 20, 1895.

Application filed July 2, 1894. Serial No. 516,301. (No model.)

*To all whom it may concern:*

Be it known that I, WILLIAM H. WILDER, a citizen of the United States, residing at Northampton, in the county of Hampshire and State of Massachusetts, have invented certain new and useful Improvements in Oil-Stoves, of which the following is a specification, reference being had therein to the accompanying drawings.

My invention consists of the base and upper drum-section removably hinged to each other and a filling-nose projecting out from a removable reservoir with its filling-opening accessible from the outside of the stove and out of the vertical plane of the reservoir.

Figure 1:
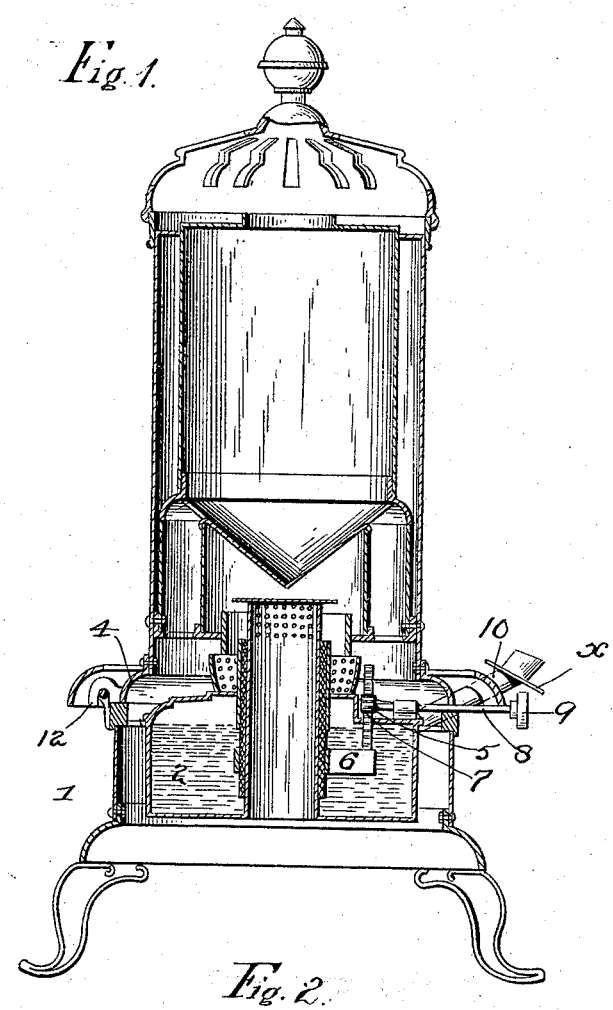
Figure 2:
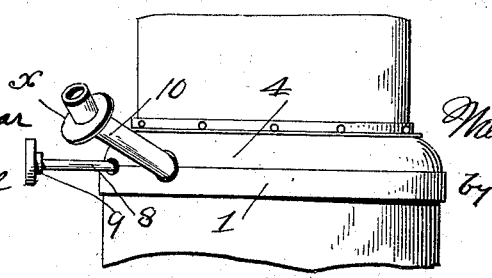

In the drawings, Figure 1 is a vertical section of a stove with my improvements, and Fig. 2 a detail view.

The base 1, with the reservoir 2, burner 3, and upper drum-section 4, may be of any desired form. The wick-raising device 5 may also be of any preferred form, and I have shown as an example a rack portion extending from a yoke 6 up through the reservoir, and having a pinion 7 engaging therewith on a spindle 8, projecting outside the stove and provided with a suitable turning-knob 9. This spindle, with its pinion, and the rack-bar are all carried by the reservoir, the spindle turning in suitable bearings thereon and projecting out through the joint between the base and drum-section. The filling tube or nose 10 also projects through the joint between the sections, and, like the wick-raising device, this is attached to and removable with the reservoir. It extends in inclined position out through the joint, so that the filling of the reservoir may be done entirely from the outside of the stove without requiring the removal of the reservoir or drum-section. If desired, however, the reservoir may be removed, and a suitable opening or slot is formed between the sections for the spout so as to permit this. By this arrangement of the filling-tube the inlet-opening is further removed from the heated section or burner, and as it is entirely outside of the stove any oil which may be spilled will not run onto the top of the reservoir and thus increase the danger of fire or make an objectionable odor. In order to deflect oil I provide a washer flange or rim around the tube near the inlet-opening in inclined position, so that any drop which may fall on the tube near the inlet end will be caught and prevented from running down the tube. This spilled oil may fall into any suitable tray or upon the ordinary base-plate on which the stove rests.

I desire to provide a hinge for the upper drum-section, which will permit it to be lifted from the base-section, and will also allow the drum-section to be swung back without removing it from the base-section and to stop in a balance position to avoid upsetting the stove. This hinge may be of any suitable construction for this purpose; but I have shown in the joint a hinge 12 in the form of a hook with the open side downward. In this open side the hinge-pin is located, and by simply lifting the drum-section it may be entirely disconnected, thus leaving the reservoir with its filling-nose and wick-raiser entirely free to be removed. The hook end of the hinge when the drum-section is tilted back acts as a stop to limit the movement and to hold the drum-section in a balanced position. This will permit access to the burner or reservoir without removing these parts.

I claim—

In combination in a stove, the base and upper drum section removably hinged together, the removable reservoir and the filling nose carried thereby and projecting laterally out through the joint between the base and drum section to be accessible from the outside of the stove and having its filling opening out of the vertical plane of the reservoir, substantially as described.

In testimony whereof I affix my signature in presence of two witnesses.

WILLIAM H. WILDER.

Witnesses:
HARLAN P. WILDER,
H. M. GATES.